Aug. 6, 1929.  M. RAJ  1,723,208

RAT TRAP

Filed Aug. 23, 1927

INVENTOR
Michael Raj
BY
ATTORNEY

Patented Aug. 6, 1929.

1,723,208

UNITED STATES PATENT OFFICE.

MICHAEL RAJ, OF NANTY GLO, PENNSYLVANIA.

RAT TRAP.

Application filed August 23, 1927. Serial No. 214,860.

This invention relates generally to animal traps and has more particular reference to a novel improvement therein.

The invention has for an object the provision of an animal trap which will trap the animal without killing it, and which is of very simple and reliable construction.

The invention has for a further object the provision of an animal trap which can be manufactured and sold at a reasonable cost.

For further comprehension of the invention and of the objects and advantages thereof, reference will be had to the following description and accompanying drawing, and to the appended claim in which the various novel features of the invention are more particularly set forth.

Referring to the accompanying drawing forming a material part of this disclosure:

Figure 1:
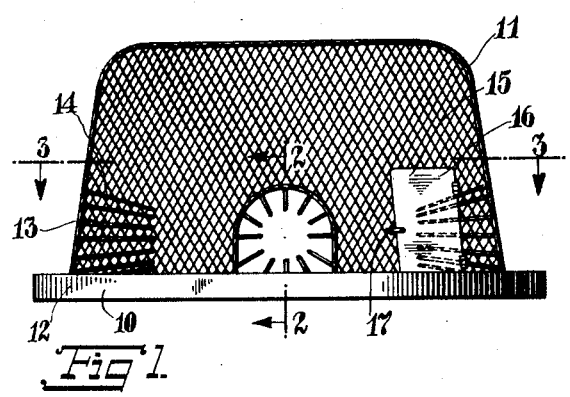
Fig. 1 is a front view of a device constructed according to this invention.
Figure 2:
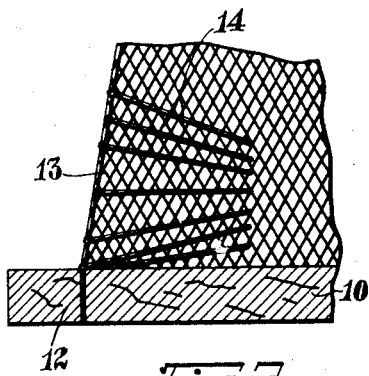
Fig. 2 is a fragmentary sectional view, taken on the line 2—2 of Fig. 1.
Figure 3:
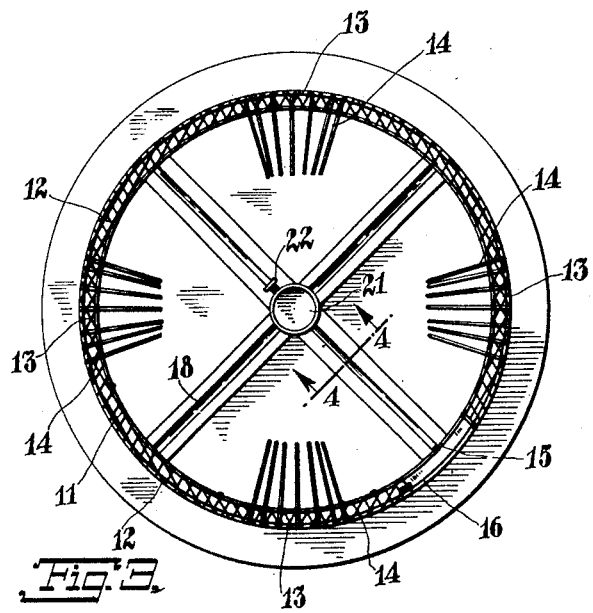
Fig. 3 is a horizontal sectional view, taken on the line 3—3 of Fig. 1.
Figure 4:
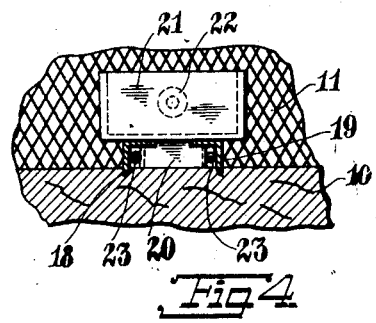
Fig. 4 is a vertical sectional view, taken on the line 4—4 of Fig. 3.
Figure 6:
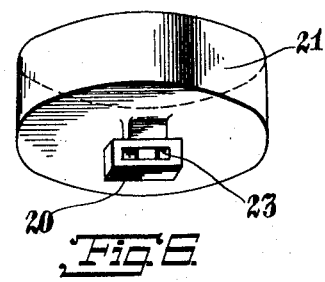
Fig. 6 is a perspective view of the bait cup.
Figure 5:
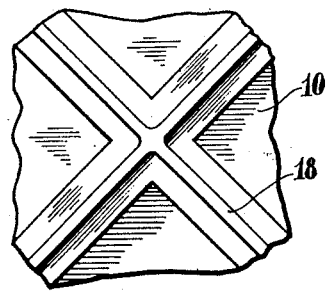
Fig. 5 is a fragmentary view of Fig. 3 with the bait cup removed.

The reference numeral 10 indicates a base upon which a wire cage 11 is positioned and held against displacement by wires 12 therefrom, forced into the base. The cage 10 is provided with several openings 13, surrounded by inwardly diverging wires 14 forming entrances for animals into the cage, and the ends of the diverging wires prevent the animals from using the entrances as exits.

The cage 11 is provided with another opening 15, and door 16 hingedly mounted on the cage forms a closure therefor. The door 16 has a locking device 17 coactable with the cage to lock the door in closed position.

A crossed guide member 18 is secured to the base by having its lower edges 19 forced therein. One of the arms of the guide member 18 extends to the door 16 and a slide 20 is engageable therein, and slidable to any part of the guide member. All of the arms of the guide member terminate adjacent the cage 11, and between the openings 13. Rats and other animals are known to be very intelligent, and can recognize a trap. The bait cup 21 may be moved to various positions as determined by the arms of the guide for at different periods of time positioning the bait cup in view thru the openings 13, or in view thru a portion of the cage between the openings. A change of this kind may serve to lure or induce an animal to enter the trap, upon the theory that the trap must be harmless since the bait is differently positioned. This slide member 20 depends from a bait cup 21, which is provided with a clamping screw 22. Springs 23 attached to the sides of the slide 20 act against the inner sides of the guide 18, so as to hold the bait cup as placed along the guide.

The operation of the device consists in opening door 16, and pulling the bait cup along the guide 18 until it is removed from the cage. A large piece of bait is next placed in the cup and clamped by set screw 22. The slide 20 of the bait cup is next reengaged in the guide 18 and moved to any part thereof, according to the discretion of the trap manipulator, judged by where an animal looking out from its bunk would most likely be attracted. The door 16 is then locked. An animal attempting to reach the bait enters by one of the openings 13 and thus becomes trapped.

While I have illustrated and described the preferred form, construction, and arrangement of the several elements employed, it will be understood that the device is nevertheless, susceptible of considerable modification therein, and I therefore reserve the right and privilege of resorting to all such changes as may be fairly embodied within the spirit and scope of the invention as claimed.

Having thus described my invention, what I claim as new and desire to secure by United States Letters Patent is:

In a device of the class described, a base, a cage secured thereon, and having several entrance openings, a crossed guide member secured to the base, the arms thereof terminating adjacent the cage and between the openings, and a bait cup adjustably connected with the crossed guide.

In testimony whereof I have affixed my signature.

MICHAEL RAJ.